United States Patent
Goto et al.

(10) Patent No.: US 10,202,283 B2
(45) Date of Patent: Feb. 12, 2019

(54) METHOD FOR PRODUCING CYCLIC SILANE USING CONCENTRATION METHOD

(71) Applicant: THIN FILM ELECTRONICS ASA, Oslo (NO)

(72) Inventors: Yuichi Goto, Toyama (JP); Kentaro Nagai, Toyama (JP); Masahisa Endo, Toyama (JP); Gun Son, Toyama (JP)

(73) Assignee: Thin Film Electronics ASA, Oslo (NO)

( * ) Notice: Subject to any disclaimer, the term of this patent is extended or adjusted under 35 U.S.C. 154(b) by 0 days.

(21) Appl. No.: 15/326,634

(22) PCT Filed: Jul. 14, 2015

(86) PCT No.: PCT/JP2015/070164
§ 371 (c)(1),
(2) Date: Jan. 16, 2017

(87) PCT Pub. No.: WO2016/010038
PCT Pub. Date: Jan. 21, 2016

(65) Prior Publication Data
US 2017/0203970 A1    Jul. 20, 2017

(30) Foreign Application Priority Data

Jul. 16, 2014 (JP) ................................. 2014-145818

(51) Int. Cl.
*C01B 33/04* (2006.01)

(52) U.S. Cl.
CPC .................................... *C01B 33/04* (2013.01)

(58) Field of Classification Search
CPC ......... H01L 21/02532; H01L 21/02576; H01L 21/02425; H01L 21/02628;
(Continued)

(56) References Cited

U.S. PATENT DOCUMENTS 4,554,180 A * 11/1985 Hirooka .................. C01B 33/04
136/258
7,498,015 B1    3/2009 Kunze et al.
(Continued)

FOREIGN PATENT DOCUMENTS

| JP | 60026664 A | 2/1985 |
| JP | 2005022964 A | 1/2005 |
| WO | 2011078299 A1 | 6/2011 |

OTHER PUBLICATIONS

International Preliminary Report on Patentability dated Jan. 17, 2017; International Application No. PCT/JP2015/070164; 9 pages; The International Bureau of WIPO, Geneva, Switzerland.
(Continued)

*Primary Examiner* — Amber R Orlando
*Assistant Examiner* — Syed T Iqbal
(74) *Attorney, Agent, or Firm* — Andrew D. Fortney; Central California IP Group, P.C.

(57) ABSTRACT

A cyclic silane having high purity, a composition containing a polysilane obtained by polymerization of the cyclic silane, and a silicon thin film are disclosed. A method for producing a cyclic silane of the formula $(SiH_2)_n$, where n is an integer of 4 to 6, includes reacting a cyclic silane compound of the formula $(SiR^1R^2)_n$ (where $R^1$ and $R^2$ are each a hydrogen atom, a $C_{1-6}$ alkyl group, or a substituted or unsubstituted phenyl group) with a hydrogen halide in the presence of an aluminum halide to obtain a cyclic silane of the formula $(SiR^3R^4)_n$ (where $R^3$ and $R^4$ are each a halogen atom), and then distilling the solution, and reducing the cyclic silane of the formula $(SiR^3R^4)_n$ with hydrogen or lithium aluminum hydride. The distillation may be carried out at a temperature of 40° C. to 80° C. under a reduced pressure of 0 to 30 Torr.

20 Claims, 1 Drawing Sheet

(58) Field of Classification Search
CPC ......... H01L 21/02579; H01L 21/02422; C01B 33/08; C01B 33/04; C09D 4/00; C09D 183/16; C09C 4/00
See application file for complete search history.

(56) References Cited

U.S. PATENT DOCUMENTS

| | | |
|---|---|---|
| 7,799,302 B1 | 9/2010 | Kunze et al. |
| 8,124,040 B1 | 2/2012 | Kunze et al. |
| 8,367,031 B1 | 2/2013 | Kunze et al. |
| 8,603,426 B1 | 12/2013 | Kunze et al. |
| 2006/0159859 A1* | 7/2006 | Iwasawa ................. C01B 33/08 427/515 |
| 2012/0061679 A1* | 3/2012 | Karshtedt .............. C08G 77/60 257/75 |
| 2012/0318662 A1 | 12/2012 | Furusho et al. |

OTHER PUBLICATIONS

International Search Report; dated Sep. 1, 2015; International Application No. PCT/JP2015/070164; 2 pages; International Searching Authority/Japan Patent Office; Tokyo, Japan.

* cited by examiner

METHOD FOR PRODUCING CYCLIC SILANE USING CONCENTRATION METHOD

TECHNICAL FIELD

The present invention relates to a cyclic silane and a method for producing the same. Further, the present invention relates to a silane polymer used for applications such as integrated circuits and thin-film transistors.

BACKGROUND ART

A silicon semiconductor is a material that has been conventionally investigated for materials for thin-film transistors (TFT) and solar cells.

In formation of a pattern of a silicon thin film used for integrated circuits and thin-film transistors, a silicon film is generally formed through a vacuum process such as a CVD process. In a method for this formation, the vacuum process is used. Therefore, a large-scale device is required. Further, there are problems in which handling is difficult since a gas is used as a raw material.

In order to solve the problems, there is a procedure in which a silane polymer is dissolved in an organic solvent, applied to a substrate, baked, and dehydrogenated to form a silicon film.

For example, a method in which a solution composition containing cyclopentasilane is prepared, applied to a substrate, and then irradiated with an ultraviolet light, and the obtained coating film is heated to form a silicon film is disclosed (see Patent Document 1).

A method for producing a silane polymer including irradiating a photopolymerizable silane compound with a light having a wavelength of 405 nm to produce a silane polymer having a weight average molecular weight that is measured by gel permeation chromatography in terms of polystyrene of 800 to 5,000 is described (see Patent Document 2).

A semiconductor thin film-forming silane composition containing (A) a solid polysilane compound synthesized by irradiating cyclopentasilane with a light having a wavelength of 170 to 600 nm, (B) cyclopentasilane, and (C) at least one compound selected from a boron compound, an arsenic compound, a phosphorus compound, and an antimony compound, characterized in that the solid polysilane compound (A) is dissolved, and the ratio of the polysilane compound (A) to the cyclopentasilane (B) is 0.1 to 100% by weight is disclosed (see Patent Document 3).

Silylcyclopentasilane used as a radical initiator for ring-opening polymerization of cyclopentasilane is disclosed (see Patent Document 4).

A composition containing an oligosilane or polysilane consisting of hydrogen and silicon and/or germanium and having a molecular weight of 450 to 2,300, which, after coating a substrate with the composition and/or printing the composition to form an oligo- or polysilane film, and then curing, forms an amorphous, hydrogenated semiconductor film having a carbon content of 0.1% by atom or less is disclosed (Patent Document 5). This document describes that oligosilane or polysilane is synthesized using a heterogeneous catalyst consisting of a transition metal element of Group 7 to 12 or a substrate-anchored derivative thereof.

PRIOR ART DOCUMENTS

Patent Documents

Patent Document 1: Japanese Patent Application Publication No. 2001-262058 (JP 2001-262058 A)

Patent Document 2: Japanese Patent Application Publication No. 2005-22964 (JP 2005-22964 A)

Patent Document 3: Japanese Patent Application Publication No. 2003-124486 (JP 2003-124486 A)

Patent Document 4: Japanese Patent Application Publication No. 2001-253706 (JP 2001-253706 A)

Patent Document 5: Japanese Translation of PCT International Application Publication No. 2010-506001 (JP-T-2010-506001)

SUMMARY OF THE INVENTION

Problem to be Solved by the Invention

An object of the present invention is to obtain a cyclic silane having high purity, and particularly cyclopentasilane having high purity. By using a composition containing a polysilane obtained by polymerization of this cyclic silane, a highly conductive and good silicon thin film is formed by applying the composition in a form of a coating-type polysilane composition to a substrate, followed by baking.

Means for Solving the Problems

A first aspect of the present invention is a method for producing a cyclic silane of Formula (3):

$$(SiH_2)n \qquad \text{Formula (3)}$$

(wherein n is an integer of 4 to 6) comprising an (A) step of reacting a cyclic silane compound of Formula (1):

$$(SiR^1R^2)n \qquad \text{Formula (1)}$$

(wherein $R^1$ and $R^2$ are each a hydrogen atom, a $C_{1-6}$ alkyl group, or an optionally substituted phenyl group, and n is an integer of 4 to 6) with hydrogen halide in cyclohexane in the presence of aluminum halide to obtain a solution containing a cyclic silane compound of Formula (2):

$$(SiR^3R^4)n \qquad \text{Formula (2)}$$

(wherein $R^3$ and $R^4$ are each a halogen atom, and n is an integer of 4 to 6), and then distilling the solution to obtain a cyclic silane compound of Formula (2), and a (B) step of dissolving the cyclic silane compound of Formula (2) in an organic solvent, and reducing the cyclic silane compound of Formula (2) with hydrogen or lithium aluminum hydride.

A second aspect is the method according to the first aspect, wherein in Formula (1), both $R^1$ and $R^2$ are phenyl groups.

A third aspect is the method according to the first aspect, wherein in Formula (2), both $R^3$ and $R^4$ are chlorine atoms.

A fourth aspect is the method according to the first aspect, wherein the cyclopentasilane is contained in an amount of 80% by mole or more in the cyclic silane of Formula (3).

A fifth aspect is the method according to any one of the first to fourth aspects, wherein distillation at the (A) step is carried out at a temperature of 40 to 80° C. under a reduced pressure of 0 to 30 Torr.

Effects of the Invention

According to the present invention, cyclohexylbenzene can be easily removed from decachloropentasilane by chlorinating a phenyl-substituted silane to produce chlorinated silane, followed by distillation. This is because a difference in boiling point between decachloropentasilane and cyclopentasilane is large. According to the present invention, a cyclic silane having high purity can be produced.

In a polysilane composition containing a polymer of a cyclic silane obtained by the method of the present invention and a silicon film obtained by applying the polysilane composition to a substrate, followed by baking, little impurities are left. Therefore, the electrical characteristics of the obtained silicon film are considered to be improved.

MODES FOR CARRYING OUT THE INVENTION

Figure 1:
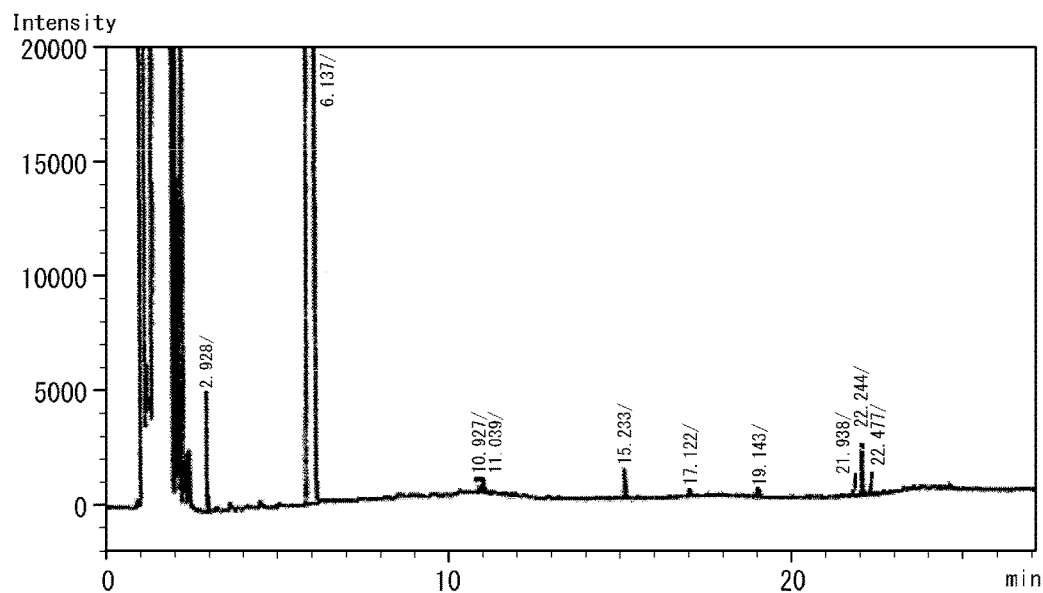
FIG. 1 is a chart of gas chromatography of cyclopentasilane obtained in Example 1.

In conventional production of a cyclic silane, cyclohexane is used as a solvent from the viewpoints of solubility of silane monomer as a raw material.

For example, a phenyl-substituted silane such as decaphenylpentasilane as a raw material is chlorinated to produce decachloropentasilane as an intermediate. The decachloropentasilane is then reduced with hydrogen or a hydride to produce a cyclic silane such as cyclopentasilane. At a step of obtaining the chlorinated pentasilane as the intermediate, a detached phenyl group may be reacted with cyclohexane as the solvent to produce cyclohexylbenzene.

This cyclohexylbenzene is contained in the solvent, and cyclopentasilane that is a final product obtained through subsequent reduction with hydrogen coexists in the solvent. In this case, it is difficult to separate the cyclohexylbenzene and the cyclopentasilane by distillation since a difference in boiling point between the cyclohexylbenzene and the cyclopentasilane is small. Therefore, the cyclohexylbenzene is left as impurities in the cyclopentasilane as the product. As a result, in a polysilane composition containing a polymer of the cyclopentasilane and a silicon film obtained by applying the polysilane composition to a substrate, followed by baking, the cyclohexylbenzene is also left. Therefore, the electrical characteristics of the obtained silicon film are considered to be deteriorated.

In contrast, the present invention relates to the method for producing a cyclic silane that is non-conventional. In a polysilane composition containing a polymer of a cyclic silane obtained by the method of the present invention and a silicon film obtained by applying the polysilane composition to a substrate, followed by baking, little impurities are left. Therefore, the electrical characteristics of the obtained silicon film are considered to be improved.

In the cyclic silane of Formula (3) obtained by the present invention, n is 4 to 6. The present invention especially aims to obtain cyclopentasilane in which n is 5 at high purity. It is preferable that the cyclic silane of Formula (3) contain cyclopentasilane in an amount of 80% by mole or more, for example, 80 to 100% by mole, or 90 to 100% by mole. It is particularly preferable that cyclopentasilane having high purity (100% by mole) be contained.

The cyclic silane of Formula (3) is produced by the (A) and (B) steps.

Examples of the $C_{1-6}$ alkyl group in the cyclic silane compound of Formula (1) used at the (A) step include methyl group, ethyl group, n-propyl group, i-propyl group, cyclopropyl group, n-butyl group, i-butyl group, s-butyl group, t-butyl group, cyclobutyl group, 1-methyl-cyclopropyl group, 2-methyl-cyclopropyl group, and n-pentyl group.

Examples of a substituent in the optionally substituted phenyl group include the alkyl groups described above.

As the cyclic silane compound of Formula (1) in which n is an integer of 4 to 6, only the cyclic silane compound in which n is 5 may be preferably used, or the cyclic silane compound in which n is 5 may be used as a main component. When n is 5 and $R^1$ and $R^2$ are phenyl groups, the cyclic silane compound is decaphenylcyclopentasilane. The decaphenylcycloentasilane may be preferably used as a raw material. Further, the cyclic silane compound may contain cyclic silane compounds in which n is 4 and 6.

At the (A) step, the cyclic silane compound of Formula (2) can be synthesized by reacting the cyclic silane compound of Formula (1) with halogen or hydrogen halide. A solution containing the cyclic silane compound of Formula (2) is obtained. Subsequently, the solution is distilled to obtain the cyclic silane compound of Formula (2). The distillation at the (A) step is carried out at a temperature of 40 to 80° C. under a reduced pressure of 0 to 30 Torr (e.g., 1 to 30 Torr, or 5 to 30 Torr) for 2 to 24 hours.

In this case, the reaction may be carried out in an organic solvent (e.g., cyclohexane, hexane, heptane, toluene, and benzene) using aluminum halide (e.g., aluminum chloride and aluminum bromide) as a catalyst. The hydrogen halide (e.g., hydrogen chloride) is required in an amount of 2n mol or more relative to 1 mol of the cyclic silane compound, for example, in an amount of 2.5n mol to 3.5n mol. Alternatively, an excessive amount of the hydrogen halide may be added. The catalyst may be added at a ratio of 0.01 mol to 2 mol to 1 mol of the cyclic silane compound.

When hydrogen chloride is used at the (A) step, $R^3$ and $R^4$ in Formula (2) are chlorine atoms.

At the (B) step, the cyclic silane compound of Formula (2) is reduced with hydrogen or lithium aluminum hydride to obtain the cyclic silane of Formula (3).

At the (B) step, the cyclic silane compound of Formula (2) is dissolved in an organic solvent (e.g., cyclohexane, hexane, heptane, toluene, and benzene), and lithium aluminum hydride dissolved in ether (e.g., diethyl ether, tetrahydrofuran, and cyclopentyl methyl ether) is gradually added to the solution, to reduce the cyclic silane compound of Formula (2). Thus, the cyclic silane compound of Formula (2) can be converted into the cyclic silane of Formula (3). At that time, the lithium aluminum hydride may be added at a ratio of 2 to 3 mol to 1 mol of the cyclic silane compound of Formula (2).

In Formula (3), n is an integer of 4 to 6. However, it is preferable that cyclopentasilane in which n is 5 be contained in an amount of 80% by mole or more, for example, 80 to 100% by mole, or 90 to 100% by mole in all the silanes to be obtained. It is particularly preferable that cyclopentasilane having high purity (100% by mole) be contained.

As the cyclic silane compound of Formula (1) that is a raw material for synthesis of the cyclopentasilane, an article on the market may be used. In the synthesis, a silane compound of Formula (a):

$$R^1R^2SiX_2 \qquad \text{Formula (a)}$$

(wherein $R^1$ and $R^2$ are each a hydrogen atom, a $C_{1-6}$ alkyl group, or an optionally substituted phenyl group, and X is a halogen atom) can be reacted in an organic solvent in the presence of alkali metal to obtain the cyclic silane compound of Formula (1).

Examples of the $C_{1-6}$ alkyl group and the optionally substituted phenyl group include the examples described above.

Examples of the halogen atom include fluorine, chlorine, bromine, and iodine atoms. A chlorine atom may be preferably used.

The alkali metal is an alkali metal such as lithium, sodium, and potassium.

The alkali metal is dispersed in an organic solvent such as tetrahydrofuran, and the silane compound of Formula (a) is further added thereto to produce the cyclic silane compound of Formula (1). The amount of the alkali metal used at that time is about 1.5 to 3 mol time that of the silane compound of Formula (a). This reaction is carried out at room temperature, and the obtained product is recrystallized.

Examples of the silane compound of Formula (a) include diphenyldichlorosilane, diphenyldibromosilane, diphenyldiiodesilane, di(phenyl chloride)dichlorosilane, dimethyldichlorosilane, and dimethyldibromosilane.

When the cyclic silane obtained as described above, for example, cyclopentasilane is polymerized, a polysilane, for example, a polymer of cyclopentasilane can be obtained. Examples of a polymerization method include a method using a catalyst and a method using thermal polymerization.

The method using a catalyst is as follows. In the method using a catalyst, the weight average molecular weight of the polysilane is 5,000 to 8,000, 5,500 to 8,000, or 5,500 to 7,000.

The weight average molecular weight can be measured by gel permeation chromatography (GPC). In the measurement, a measurement device is HLC-8320GPC (product name, manufactured by TOSOH CORPORATION), a column is GPC/SEC (PLgel, 3 μm, 300×7.5 mm, manufactured by Varian, Inc.), a column temperature is 35° C., a detector is RI, a flow rate is 1.0 mL/min, a measurement time is 15 minutes, an eluent is cyclohexane, and an injection volume is 10 μL. The weight average molecular weight of a product can be measured by forming a calibration curve using CPS (Mw 150, RT=11.040 minutes), CPS-dimer (Mw 298, RT=10.525 minutes), CPS-Trimer (Mw 446, RT=9.725 minutes) as standard substances.

The polysilane is obtained by polymerization of cyclopentasilane in the presence of a palladium catalyst supported on a polymer.

The polymerization ratio of the mass of the produced polymer relative to the mass to be prepared is 50% or more, preferably 70% or more, and preferably 80% or more.

The polysilane is a polymer of cyclopentasilane. In the production of the polysilane, cyclopentasilane is a main raw material. However, the polysilane may contain other silanes. Examples of the other silanes include cyclotrisilane, cyclotetrasilane, cyclopentasilane, cyclohexasilane, and cycloheptasilane. Examples of a silane having two cyclic structures include 1,1'-bicyclobutasilane, 1,1'-bicyclopentasilane, 1,1'-bicyclohexasilane, 1,1'-bicycloheptasilane, 1,1'-cyclobutasilylcyclopentasilane, 1,1'-cyclobutasilylcyclohexasilane, 1,1'-cyclobutasilylcycloheptasilane, 1,1'-cyclopentasilylcyclohexasilane, 1,1'-cyclopentasilylcycloheptasilane, 1,1'-cyclohexasilylcycloheptasilane, spiro[2.2]pentasilane, spiro[3.3]heptasilane, spiro[4.4]nonasilane, spiro[4.5]decasilane, spiro[4.6]undecasilane, spiro[5.5]undecasilane, spiro[5.6]undecasilane, and spiro[6.6]tridecasilane.

Examples thereof may include silane compounds in which a hydrogen atom in skeleton of the silanes described above is substituted by a $SiH_3$ group or a halogen atom (e.g., chlorine atom, and bromine atom).

The high-molecular-weight polysilane is obtained by the following reaction.

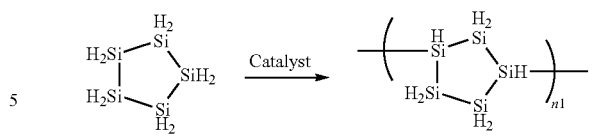

$n1$ is the number of repeating unit, and is the number corresponding to a weight average molecular weight. The structure of the obtained polymer of cyclopentasilane is typically a linear structure, but a three-dimensionally bonded structure is also considered.

Examples of the catalyst used in the polymerization reaction include palladium catalysts supported on a polymer. In particular, a catalyst in which palladium is immobilized on a functional polystyrene is preferred. Examples of an immobilization method on the functional polystyrene include a method of microencapsulating a palladium complex with the functional polystyrene and a method of forming a palladium compound in which palladium is bonded to the functional polystyrene.

When the palladium complex is used, examples of palladium include zero-valent metal palladium and divalent palladium. Examples of the zero-valent palladium complex include a tetrakis(triphenylphosphine)palladium (0) complex. Examples of the divalent palladium include palladium acetate and palladium chloride.

The functional polystyrene is a styrene derivative or a styrene copolymer, and examples thereof include structures in which a functional group is bonded to a styrene unit. Examples of the functional group include a polyethylene oxide group having a hydroxy group at the terminal and a diphenylphosphino group.

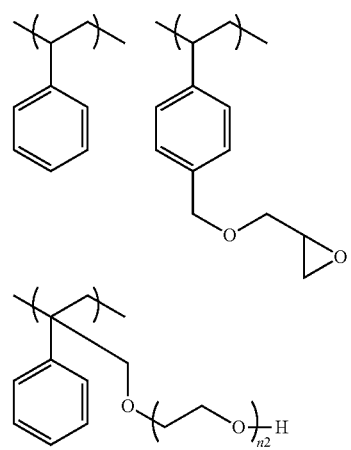

$n2$ is the number of repeating unit, and is in a range of 1 to 10.

For example, the polymer-supported palladium catalyst can be obtained by holding the functional polystyrene and the tetrakis(triphenylphosphine)palladium (0) complex at 120° C. for 2 hours.

Examples of microencapsulation of the zero-valent palladium complex or the divalent palladium compound with polystyrene may include as follows.

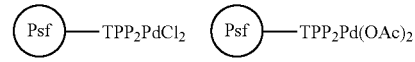

-continued

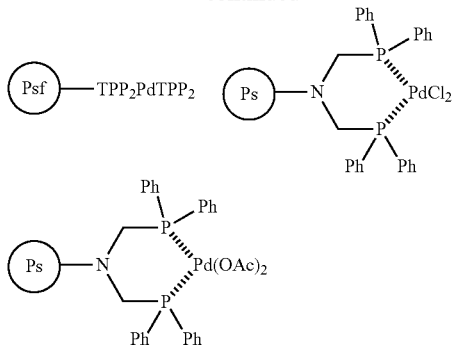

Ps is polystyrene, Psf is functional polystyrene, Ph is phenyl group, TPP is triphenylphosphine ligand, and Ac is acetyl group.

Examples of bonding of the palladium to the functional polystyrene may include as follows.

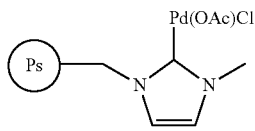

Ps is polystyrene, and Ac is acetyl group.

In the polymer-supported palladium catalyst, palladium may be contained in an amount of 0.1 to 10% by mass, or 2 to 4% by mass in the polymer.

When cyclopentasilane is polymerized in the presence of the polymer-supported palladium catalyst, the amount of the catalyst to be added may be set so that a ratio of palladium is 0.1 to 10% by mass or 0.1 to 1% by mass relative to cyclopentasilane. The polymerization reaction is carried out under an inert gas atmosphere such as nitrogen, helium, and argon. Thus, oxygen is blocked. For example, the oxygen concentration is 1 ppm or less. The polymerization reaction may be carried out by dissolving cyclopentasilane and the catalyst in a solvent, or the polymerization reaction may be carried out without a solvent. The polymerization reaction may be carried out at a reaction temperature of room temperature to 100° C. The reaction time may be 1 to 15 hours. The reaction may be terminated by adding cyclohexane or cyclooctane.

By thermal polymerization, the cyclic silane may be polymerized to obtain a polysilane.

For example, the method for producing a polysilane is characterized by heating cyclopentasilane to a temperature of 50° C. to 120° C. In particular, cyclopentasilane is heated to a temperature of 80° C. to 100° C. to obtain a polymer having a narrow molecular weight distribution and a large weight average molecular weight.

Cyclopentasilane in a shaded glass tube is heated to a predetermined temperature in an inert gas with oxygen blocked to obtain a polymer of cyclopentasilane. The polymer of cyclopentasilane is dissolved in an organic solvent (e.g., cyclohexane), and a volatile component is then removed under reduced pressure to obtain the polymer of cyclopentasilane.

As the inert gas, for example, nitrogen, helium, argon, or the like is used. With oxygen blocked is a state in which the oxygen concentration in the glass tube is 1 ppm or less.

The heating temperature is 50° C. to 120° C., and the heating time is about 0.5 hours to about 6 hours. The heating time can be shortened within the range of the heating time depending on the heating temperature increased.

The obtained polysilane is a polymer of cyclopentasilane, for example, is obtained as a 1% by mass to 20% by mass solution in an organic solvent. A composition in which the obtained polymer of cyclopentasilane is dissolved in a solvent and the concentration of the polymer is adjusted can be obtained. For example, even when a 13.5% by mass solution in an organic solvent (cyclohexane) is obtained, the obtained solution is transparent.

In the obtained polymer of cyclopentasilane, the weight average molecular weight is about 600 to about 3,000, and the Mw/Mn ratio of the weight average molecular weight Mw to the number average molecular weight Mn is 1.03 to 1.55. The polymer of cyclopentasilane is a polymer having narrow molecular weight distribution.

The polymer can be obtained at a yield as high as 80 to 90%.

The obtained polysilane product can be purified by removing a volatile component under reduced pressure, and can be stored in a state where the product is dissolved in a solvent. Examples of the solvent used in storage of polysilane include hydrocarbon solvents such as n-hexane, n-heptane, n-octane, n-decane, cyclohexane, cyclooctane, dicyclopentane, benzene, toluene, xylene, durene, indene, tetrahydronapthalene, decahydronaphthanylene, and squalane; ether-based solvents such as dipropyl ether, ethylene glycol dimethyl ether, ethylene glycol diethyl ether, ethylene glycol methyl ethyl ether, diethyleneglycol dimethyl ether, diethylene glycol diethyl ether, diethylene glycol methyl ethyl ether, tetrahydrofuran, tetrahydropyran, 1,2-dimethoxyethane, bis(2-methoxyethyl) ether, and p-dioxane; propylene carbonate, γ-butyrolactone, N-methyl-2-pyrrolidone, dimethylformamide, acetonitrile, and dimethylsulfoxide.

Among the solvents, cyclooctane is preferably used. A polysilane composition in which 5 to 8% by mass of the polysilane is contained in cyclooctane can be produced.

To the polysilane, a substance containing an element of Group 3B or 5B can be added as a dopant. Examples of the substance include compounds of phosphorus, boron, and the like. The polysilane composition in which such a dopant is added is applied to a substrate, and is subjected to a treatment including heating. Thus, an n-type or p-type silicon film can be formed.

In a method for forming a silicon film, the polysilane composition is applied to a substrate, and dehydrogenated by a heat treatment or the like, to obtain the silicon film. In the coating, a device for spin coating, roll coating, dip coating, or the like is used. After the coating, a heat treatment is carried out. For example, the revolution speed of spinner in a spin coating method is 500 to 1,000 rpm.

It is preferable that a coating step be carried out under an inert gas atmosphere, for example, under a stream of gas of nitrogen, helium, argon, or the like.

The substrate coated with the composition is subjected to a heat treatment at a heating temperature of 100 to 425° C. for 10 to 20 minutes.

The obtained silicon film has a thickness falling within a range of 60 to 100 nm.

Examples of the substrate include a transparent electrode of quartz, glass, and ITO, an electrode of metal such as gold,

EXAMPLES

Hereinafter, the present invention will be described more specifically with reference to Examples, but the present invention is not limited to the following Examples.

Example 1

In a 2-L reaction flask, decaphenylcyclopentasilane (500.0 g) and cyclohexane (453.7 g) as a solvent were placed under a nitrogen atmosphere, aluminum chloride $AlCl_3$ (14.7 g) was further added, and a hydrogen chloride HCl gas was blown at a flow rate of 280 mL/min for 8 hours. At that time, the temperature was controlled to 20° C. to 30° C. by a water bath. Subsequently, reducing a pressure and returning the pressure using nitrogen were repeated 10 times to remove hydrogen chloride. The resultant was filtered through a membrane filter to obtain a cyclohexane solution of decachlorocyclopentasilane (1099.5 g).

From the cyclohexane solution of decachlorocyclopentasilane (1099.5 g), the solvent was removed at 20 to 30° C. and 25 Torr for 2 hours. Cyclohexylbenzene was removed by distillation at 60° C. and 13 Torr for 4 hours to obtain high-purity decachlorocyclopentasilane (268.56 g). To the decachlorocyclopentasilane, cyclohexane (814.5 g) was added and dissolved, and the mixture was filtered through a membrane filter, and washed with cyclohexane (50 g) to obtain a cyclohexane solution of high-purity decachlorocyclopentasilane (1100.6 g).

This solution was placed in a 2-L reaction flask under an argon atmosphere, and a solution of hydrogenated aluminum lithium $LiAlH_4$ (57.5 g) in diethyl ether (269.6 g) was added dropwise at 0 to 10° C. over 2 hours. The mixture was stirred at room temperature for 1 hour. To the reaction solution, ion-exchanged water (592.7 g) was added dropwise at 0 to 10° C. over 1 hour. The mixture was stirred for 10 minutes, and allowed to stand, and an aqueous phase portion was removed. Subsequently, ion-exchanged water (592.7 g) was added at room temperature. This water-washing operation was repeated 4 times. An organic phase was dried over magnesium sulfate (23.7 g) for 1 hour, filtered through a membrane filter, concentrated, and distilled to obtain target cyclopentasilane (51.4 g).

As seen from a result of gas chromatographic analysis (FIG. 1), cyclopentasilane did not contain cyclohexylbenzene. The content of cyclopentasilane was 99.2%.

(Gas Chromatography Condition)
Column: TC-1; df=0.25 μm, 0.25 mm×30 m (available from GL Sciences Inc.)
Carrier gas: HE 57.7 cm/sec (199.9 kPa)*control of linear velocity
Column temperature: 50° C. (held for 10 minutes)→100° C./min→*150° C. (held for 10 minutes)→100° C./min→*280° C. (held for 5 minutes)
Injector: Split (20), 150° C., 8 μL
Detector: FID (280° C.)
Sample concentration: 1,000 ppm (in cyclohexane)

Comparative Example 1

In a 2-L reaction flask, decaphenylcyclopentasilane (500.0 g) and cyclohexane (453.7 g) as a solvent were placed under a nitrogen atmosphere, aluminum chloride $AlCl_3$ (14.7 g) was further added, and a hydrogen chloride HCl gas was blown at a flow rate of 280 mL/min for 8 hours. At that time, the temperature was controlled to 20° C. to 30° C. by a water bath. Subsequently, reducing a pressure and returning the pressure using nitrogen were repeated 10 times to remove hydrogen chloride. The resultant was filtered through a membrane filter to obtain a cyclohexane solution of decachlorocyclopentasilane (1099.5 g).

This solution was placed in a 2-L reaction flask under an argon atmosphere, and a solution of hydrogenated aluminum lithium $LiAlH_4$ (57.5 g) in diethyl ether (269.6 g) was added dropwise at 0 to 10° C. over 2 hours. The mixture was stirred at room temperature for 1 hour. To the reaction solution, ion-exchanged water (592.7 g) was added dropwise at 0 to 10° C. over 1 hour. The mixture was stirred for 10 minutes, and allowed to stand, and an aqueous phase portion was removed. Subsequently, ion-exchanged water (592.7 g) was added at room temperature. This water-washing operation was repeated 4 times. An organic phase was dried over magnesium sulfate (23.7 g) for 1 hour, filtered through a membrane filter, concentrated, and distilled to obtain target cyclopentasilane (52.2 g).

Figure 2:
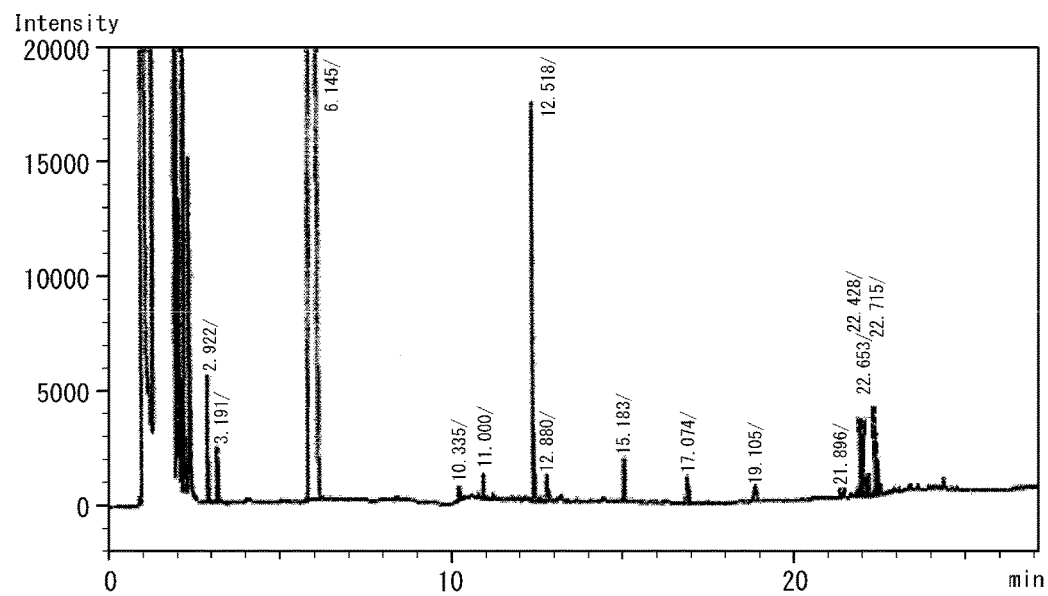
FIG. 2 is a chart of gas chromatography of cyclopentasilane obtained in Comparative Example 1.

As seen from a result of gas chromatographic analysis (FIG. 2), cyclopentasilane contained cyclohexylbenzene in an amount of 4.9%. The content of cyclopentasilane was 92.4%. The gas chromatography condition was the same as described above.

Example 2

In a 2-L reaction flask, decaphenylcyclopentasilane (500.0 g) and toluene (453.7 g) as a solvent were placed under a nitrogen atmosphere, aluminum chloride $AlCl_3$ (14.7 g) was further added, and a hydrogen chloride HCl gas was blown at a flow rate of 280 mL/min for 8 hours. At that time, the temperature was controlled to 20° C. to 30° C. by a water bath. Subsequently, reducing a pressure and returning the pressure using nitrogen were repeated 10 times to remove hydrogen chloride. The resultant was filtered through a membrane filter to obtain a toluene solution of decachlorocyclopentasilane (1167.2 g).

From the toluene solution of decachlorocyclopentasilane (1167.2 g), the solvent was removed at 20 to 30° C. and 25 Torr for 2 hours. Diphenylmethane was removed by distillation at 60° C. and 13 Torr for 4 hours to obtain decachlorocyclopentasilane (278.2 g). To the decachlorocyclopentasilane, cyclohexane (814.5 g) was added and dissolved, and the mixture was filtered through a membrane filter to obtain a cyclohexane solution of decachlorocyclopentasilane (1092.7 g).

This solution was placed in a 2-L reaction flask under an argon atmosphere, and a solution of hydrogenated aluminum lithium $LiAlH_4$ (57.5 g) in diethyl ether (269.6 g) was added dropwise at 0 to 10° C. over 2 hours. The mixture was stirred at room temperature for 1 hour. To the reaction solution, ion-exchanged water (592.7 g) was added dropwise at 0 to 10° C. over 1 hour. The mixture was stirred for 10 minutes, and allowed to stand, and an aqueous phase portion was removed. Subsequently, ion-exchanged water (592.7 g) was added at room temperature. This water-washing operation was repeated 4 times. An organic phase was dried over magnesium sulfate (23.7 g) for 1 hour, filtered through a membrane filter, concentrated, and distilled to obtain target cyclopentasilane (51.4 g).

As seen from a result of gas chromatographic analysis, cyclopentasilane contained diphenylmethane in an amount of 0.1%. The content of cyclopentasilane was 92.6%.

Comparative Example 2

In a 2-L reaction flask, decaphenylcyclopentasilane (500.0 g) and toluene (453.7 g) as a solvent were placed under a nitrogen atmosphere, aluminum chloride AlCl$_3$ (14.7 g) was further added, and a hydrogen chloride HCl gas was blown at a flow rate of 280 mL/min for 8 hours. At that time, the temperature was controlled to 20° C. to 30° C. by a water bath. Subsequently, reducing a pressure and returning the pressure using nitrogen were repeated 10 times to remove hydrogen chloride. The resultant was filtered through a membrane filter to obtain a toluene solution of decachlorocyclopentasilane (1167.2 g).

This solution was placed in a 2-L reaction flask under an argon atmosphere, and a solution of hydrogenated aluminum lithium LiAlH$_4$ (57.5 g) in diethyl ether (269.6 g) was added dropwise at 0 to 10° C. over 2 hours. The mixture was stirred at room temperature for 1 hour. To the reaction solution, ion-exchanged water (592.7 g) was added dropwise at 0 to 10° C. over 1 hour. The mixture was stirred for 10 minutes, and allowed to stand, and an aqueous phase portion was removed. Subsequently, ion-exchanged water (592.7 g) was added at room temperature. This water-washing operation was repeated 4 times. An organic phase was dried over magnesium sulfate (23.7 g) for 1 hour, filtered through a membrane filter, concentrated, and distilled to obtain target cyclopentasilane (51.4 g).

As seen from a result of gas chromatographic analysis, cyclopentasilane contained diphenylmethane in an amount of 0.2%. The content of cyclopentasilane was 96.0%.

INDUSTRIAL APPLICABILITY

A high-purity cyclic silane, and particularly high-purity cyclopentasilane can be obtained. According to a composition containing a polysilane obtained by polymerization of this cyclic silane, a highly conductive and good silicon thin film can be formed by applying the composition in a form of a coating-type polysilane composition to a substrate, followed by baking.

The invention claimed is:

1. A method for producing a cyclic perhydrosilane of Formula (3):

$$(SiH_2)_n \quad (3)$$

wherein n is an integer of 4 to 6, comprising:
reacting a cyclic silane compound of Formula (1):

$$(SiR^1R^2)_n \quad (1)$$

wherein R$^1$ and R$^2$ are each a C$_{1-6}$ alkyl group or a substituted or unsubstituted phenyl group, and n is an integer of 4 to 6, with a hydrogen halide in an alkane, cycloalkane, arene or alkylarene solvent having 6-10 carbon atoms in a presence of an aluminum halide to obtain a solution containing a cyclic perhalosilane compound of Formula (2):

$$(SiR^3R^4)_n \quad (2)$$

wherein R$^3$ and R$^4$ are each a halogen atom, and n is an integer of 4 to 6, then
distilling the solution including the cyclic perhalosilane compound of Formula (2) to purify the cyclic perhalosilane compound of Formula (2), and
dissolving the purified cyclic perhalosilane compound of Formula (2) in an organic solvent, and reducing the purified cyclic perhalosilane compound of Formula (2) with hydrogen or lithium aluminum hydride.

2. The method according to claim 1, wherein both R$^1$ and R$^2$ are phenyl groups, and the alkane, cycloalkane, arene or alkylarene solvent is the cycloalkane, benzene or toluene.

3. The method according to claim 1, wherein both R$^3$ and R$^4$ are chlorine atoms, and the alkane, cycloalkane, arene or alkylarene solvent is the cycloalkane, benzene or toluene.

4. The method according to claim 1, wherein the cyclic perhydrosilane of Formula (3) contains cyclopentasilane in an amount of 90% or more by moles.

5. The method according to claim 1, wherein the solution is distilled at a temperature of 40° C. to 80° C.

6. The method according to claim 5, wherein the solution is distilled at a pressure of 0 to 30 Torr.

7. The method according to claim 2, wherein the solution is distilled at a temperature of 40° C. to 80° C.

8. The method according to claim 7, wherein the solution is distilled at a pressure of 0 to 30 Torr.

9. The method according to claim 3, wherein the solution is distilled at a temperature of 40° C. to 80° C.

10. The method according to claim 9, wherein the solution is distilled at a pressure of 0 to 30 Torr.

11. The method according to claim 4, wherein the solution is distilled at a temperature of 40° C. to 80° C. and a pressure of 0 to 30 Torr.

12. The method according to claim 6, wherein the pressure is 5 to 30 Torr, and the solution is distilled for 2 to 24 hours.

13. The method according to claim 8, wherein the pressure is 5 to 30 Torr, and the solution is distilled for 2 to 24 hours.

14. The method according to claim 2, wherein the alkane, cycloalkane, arene or alkylarene solvent is cyclohexane, and distilling the solution removes cyclohexylbenzene from the cyclic perhalosilane compound of Formula (2).

15. The method according to claim 1, wherein reducing the purified cyclic perhalosilane compound of Formula (2) with hydrogen or lithium aluminum hydride produces the cyclic perhydrosilane of Formula (3), and the method further comprises, after reducing the purified cyclic perhalosilane compound of Formula (2) with hydrogen or lithium aluminum hydride, distilling the cyclic perhydrosilane of Formula (3).

16. The method according to claim 4, wherein the cyclic perhydrosilane of Formula (3) contains cyclopentasilane in an amount of 99% or more by moles.

17. The method according to claim 1, further comprising reacting a compound of the formula R$^1$R$^2$SiX$_2$ with an alkali metal in an organic solvent, wherein X is a halogen atom, to obtain the cyclic silane of the Formula (1).

18. The method according to claim 1, further comprising polymerizing the cyclic perhydrosilane of Formula (3) using a catalyst to obtain a polysilane.

19. The method according to claim 18, wherein the catalyst comprises a palladium catalyst supported on a polymer.

20. The method according to claim 1, further comprising, after reducing the purified cyclic perhalosilane compound of Formula (2) with hydrogen or lithium aluminum hydride, washing the cyclic perhydrosilane of Formula (3) with water.

* * * * *